United States Patent [19]

Hung et al.

[11] Patent Number: 4,701,396

[45] Date of Patent: Oct. 20, 1987

[54] PHOTOCONDUCTIVE PHTHALOCYANINE PIGMENTS, ELECTROPHOTOGRAPHIC ELEMENTS CONTAINING THEM AND A METHOD OF USE

[75] Inventors: Yann Hung; Thomas R. Klose; Michael T. Regan; Louis J. Rossi, all of Rochester, N.Y.

[73] Assignee: Eastman Kodak Company, Rochester, N.Y.

[21] Appl. No.: 860,352

[22] Filed: May 6, 1986

[51] Int. Cl.$^4$ .............................................. G03G 5/06
[52] U.S. Cl. .................................... 430/58; 430/59; 430/78; 540/141
[58] Field of Search ................. 260/314.5; 430/83, 57, 430/64, 81, 78; 540/141, 58, 59

[56] References Cited

U.S. PATENT DOCUMENTS

| | | | |
|---|---|---|---|
| 4,031,109 | 6/1977 | Griffiths et al. | 430/136 |
| 4,419,429 | 12/1983 | Nakazawa | 430/83 |
| 4,426,434 | 1/1984 | Arishama et al. | 430/128 |
| 4,458,004 | 7/1984 | Tanikawa | 430/270 |
| 4,514,481 | 4/1985 | Scazzafava et al. | 430/58 |

FOREIGN PATENT DOCUMENTS

| | | |
|---|---|---|
| 0180930 | 10/1985 | European Pat. Off. . |
| 0180931 | 10/1985 | European Pat. Off. . |
| 59-214034 | 12/1984 | Japan . |

OTHER PUBLICATIONS

Derwent Abstract 85-287417/46.
Chem. Abstracts, 176490y, vol. 102, p. 646 (1985).

Primary Examiner—John L. Goodrow
Attorney, Agent, or Firm—Robert A. Gerlach

[57] ABSTRACT

Near infrared sensitive photoconductive elements are made from fluorine-substituted titanylphthalocyanine pigments which can be dispersion coated.

21 Claims, No Drawings

PHOTOCONDUCTIVE PHTHALOCYANINE PIGMENTS, ELECTROPHOTOGRAPHIC ELEMENTS CONTAINING THEM AND A METHOD OF USE

FIELD OF THE INVENTION

This invention relates to phthalocyanine pigments and more particularly to novel photoconductive fluorine-substituted titanyl phthalocyanine pigments, to photoconductive elements containing them and to a method of forming electrophotographic images with such elements.

BACKGROUND OF THE INVENTION

Electrophotographic imaging processes employ a photoconductive element comprising an insulating photoconductive layer disposed on an electrically conductive support. Photoconductive layers have in the past contained various inorganic photoconductors such as amorphous selenium, cadmium sulfide or lead oxide or organic photoconductors such as polyvinyl carbazole and aryl amine compounds. While many of the common photoconductors have good electrophotographic sensitivity in the wavelength range from ultraviolet to red, their sensitivity in the near infrared range above about 700 nm is not sufficiently high for use with diode lasers which currently are of great importance in recording techniques.

In lieu of the more commonly used photoconductors it has been suggested that certain metal phthalocyanines which absorb in the near infrared region be employed. For example, U.S. Pat. No. 4,426,434 suggests a photoreceptor having an evaporated film of chloroaluminum phthalocyanine or chloroaluminum monochlorophthalocyanine. It is said that such compounds have high photosensitivity in the near infrared region. Unfortunately, such compounds, as well as many other phthalocyanines, evidently are not readily dispersible in coating formulations and, to deposit them as photoconductive layers, the expensive procedure of vacuum evaporation must be used.

The patent to Tanikawa, U.S. Pat. No. 4,458,004 dated July 3, 1984 discloses an optical recording medium containing a fluorine-substituted pthalocyanine. A structural formula in the patent shows a central symbol M which is said to represent, among many other things, titaium oxide. The patent does not suggest, however, that any of the indicated phthalocyanines are photoconductive or that they can be dispersion coated to form photoconductive layers of low granularity. No method of preparation of the phthalocyanines is mentioned.

SUMMARY OF THE INVENTION

In accordance with the present invention new photoconductive phthalocyanine pigments are provided which not only have high electrophotographic sensitivity in the near infrared region but, in addition, are readily dispersible in polymeric binders and have extremely low granularity when dispersed in the polymeric binder of a photoconductive layer. Photoconductive elements can be prepared with these novel phthalocyanines by the relatively inexpensive procedure of dispersion coating. The resulting near infrared-sensitive photoconductive elements provide excellent image resolution because of the small particle size and dispersability of the photoconductive phthalocyanine compounds. Also, because they can be deposited on a substrate by dispersion coating, it is possible to make single layer and inverted multilayer photoconductive elements with the novel phthalocyanine pigments of the invention.

The novel pigments of the invention are photoconductive titanyl phthalocyanines having fluorine substitution in one or more of their carbocyclic rings. The near infrared sensitive photoconductive elements of the invention comprise an electrically conductive substrate and a photoconductive layer comprising a binder resin and a phthalocyanine as described, and especially such an element wherein the phthalocyanine of the photoconductive layer is deposited by dispersion coating.

The method of the invention comprises electrostatically charging a photoconductive element of the type described, exposing it to a pattern of near infrared radiation and developing the resulting charge pattern.

DETAILED DESCRIPTION

The photoconductive titanyl fluorophthalocyanine pigments of the invention can be prepared by the reaction of a fluorine-substituted phthalonitrile with a titanlum chloride in a hot solvent, as illustrated below, wherein the letter n represents an integer from 1 to 4.

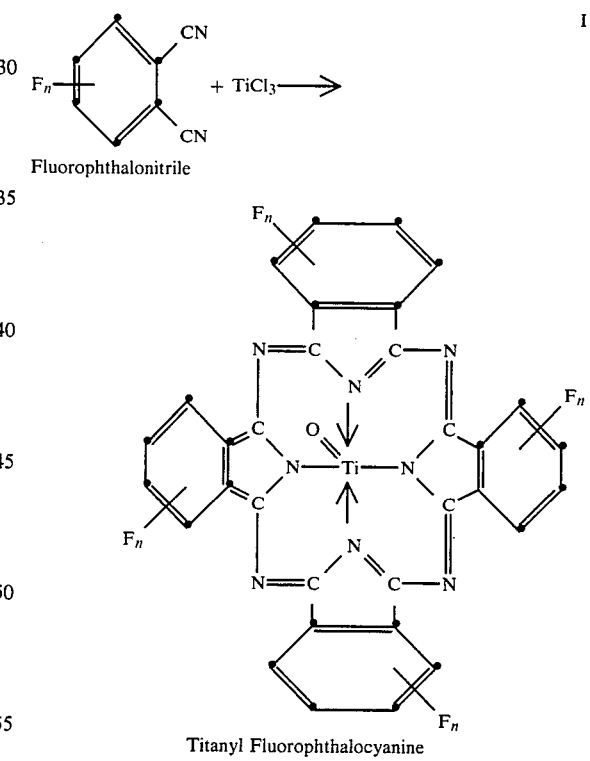

Titanyl Fluorophthalocyanine

Since the fluorine substituted phthalonitrile molecules which have fewer than four fluorine substituents can combine with each other in different spatial configurations, the reaction product will be a mixture of isomeric titanyl fluorophthalocyanines. When tetrafluoro phthalonitrile is the starting material, only one isomer forms, i.e., titanylhexadecyl fluorophthalocyanine.

Although the maximum benefits of the invention have been found with pigments of formula I, wherein the phthalocyanine is synthesized from a single fluoro-substituted phthalonitrile, the invention also includes novel fluorine substituted titanyl phthalocyanines in which not all of the aromatic rings have fluorine substituents or do not have an equal number of fluorine substituents.

Non-uniformly substituted compounds of this type can be made by reacting titanium trichloride with two or more phthalonitriles, one of which is a fluorophthalonitrile as illustrated above, and the other or others of which are of the formula

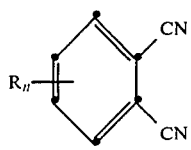

wherein R can be hydrogen, a halogen such as fluorine, chlorine or bromine, iodine or a hydrocarbon radical such as lower alkyl, e.g., methyl, ethyl, isopropyl and t-butyl, and n is an integer from 1 to 4.

When the titanyl phthalocyanine having fluorine ring substitution is made in this manner by the reaction of two or more phthalonitriles the reaction product will contain a mixture of substituted oxotitanium phthalocyanines. This mixture will include phthalocyanines in which as few as one of the aromatic rings is fluorine substituted. Thus, while phthalocyanines having only fluorine substituents, and those being equal in number on each aromatic ring, are preferred pigments of the invention, photoconductive fluorine-substituted-titanyl phthalocyanines which are non-uniformly substituted are also within the scope of the invention and have valuable qualities such as good dispersability in coating compositions.

Before using the fluoro titanylphthalocyanine pigment as a near infrared sensitive electrophotographic charge generation compound, it is subjected to a treatment which purifies it, modifies its crystalline form and reduces the particle size.

The resulting novel pigment is photoconductive. By this is meant that in the dark the pigment is electrically insulating but when exposed to actinic radiation in the near infrared region, it becomes electrically conductive. More specifically, the dark resistivity is greater than $10^{11}$ ohm-cms at 25° C. and is rapidly reduced several orders of magnitude when exposed to actinic radiation in the near infrared region (700–900 nm) at an intensity of 5 to 30 ergs/cm$^2$/sec. Typically, a charged photoconductor discharges by at least 50 volts within 10 seconds when exposed to such radiation. For the more sensitive pigments of the invention, e.g., the tetrafluoro species, the conductivity upon exposure to near infrared radiation is such that a photoconductive element containing the pigment in its charge generation layer can be discharged from −500 volts to −100 volts in one second at an exposure of 7 ergs per cm$^2$ and a wavelength of 830 nm.

One useful procedure for rendering the pigment photoconductive is called "acid-pasting". It involves dissolving the pigment, after extraction purification with a solvent such as dimethylformamide, in cold concentrated mineral acid, preferably sulfuric acid. The solution is poured into ice water to reprecipitate the phthalocyanine compound. The precipitate is washed free of acid with water, then with methanol and then is dried. The resulting purified pigment when dispersed in a binder resin has a substantially smaller particle size than the crude pigment and is highly sensitive to radiation in the near infrared region.

The photoconductive elements of the invention comprise an electrically conductive substrate having disposed on it a photoconductive layer containing a titanyl fluoro phthalocyanine compound I. The phthalocyanine compound can be deposited on the conductive substrate as the sole component of the photoconductive layer or in admixture with other components such as a resin binder, a coating aid, other photoconductive compounds, chemical sensitizers and spectral sensitizing dyes and pigments.

Although the photoconductive elements of the invention can have only a single photoconductive layer, the preferred photoconductive elements are multilayer (also called multiactive) elements having a charge generation layer and at least one charge transport layer. The configurations and general principles of multilayer elements have been described in the prior art, for example, in the patent to Berwick et al, U.S. Pat. No. 4,175,960. When employed in multilayer photoconductive elements in accordance with the present invention, the titanyl fluoro phthalocyanine compound is placed in the charge generation layer.

The photoconductive elements of the invention are used according to the method of the invention to make electrophotographic images, as in diode laser recording. In the method, the photoconductive element is electrostatically charged, e.g., by corona treatment, to a voltage, for example, of 500 to 600 volts negative or positive. Then it is exposed to a pattern of near infrared irradiation, causing charge to dissipate in the exposed regions. The resulting charge pattern on the photoconductive element is developed by contact with a positively or negatively charged toner. Suitable developers include liquid and dry developers which are well known in the art. Such liquid developers comprise dispersion of pigmented polymeric toner particles in a volatile insulating liquid such as an isoparaffinic hydrocarbon. Useful dry developers include both single component and two-component developers, the latter comprising, for example, a mixture of magnetic carrier particles and powdered toner particles composed of a pigmented thermoplastic resin.

The preparation of a specific titanyl fluorophthalocyanine, namely, the compound titanyl 2, 9, 16, 23-tetrafluorophthalocyanine and its isomers, will illustrate how compounds of the invention and their precursors can be made.

The titanyl tetrafluorophthalocyanine compound can be prepared by the reaction of 4-fluorophthalonitrile with titanium trichloride in 1-chloronaphthalene at 210°–215° C. The synthesis of 4-fluorophthalonitrile as the precursor for the polyfluorinated phthalocyanine starts with 3,4-dimethylaniline and is shown in the following series of reactions:

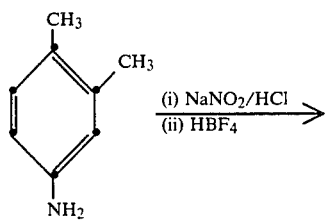

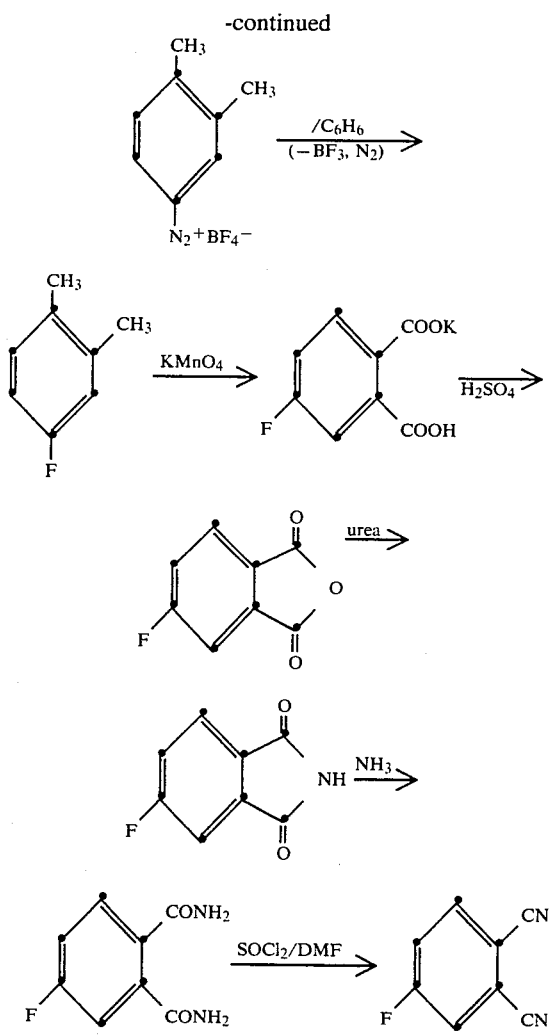

Diazotization (i) and conversion (ii) to the tetrafluoroborate followed by pyrolysis in benezene of that derivative (Balz-Schieman reaction) gives 3,4-dimethylfluorobenzene. This is oxidized by aqueous potassium permanganate to 4-fluorophthalic acid, monopotassium salt. Vacuum distillation of the latter in the presence of sulfuric acid yields 4-fluorophthalic anhydride. Treatment of the anhydride with urea in boiling chlorobenzene yields the imide which is converted with concentrated ammonium hydroxide to the diamide. Finally, dehydration of the diamide with thionyl chloride in dimethylformamide gives 4-fluorophthalonitrile.

The following example describes the use of 4-fluorophthalonitrile, prepared as described above, to prepare a polyfluoro phthalocyanine compound of the invention.

EXAMPLE 1

Preparation of Titanyl Tetrafluorophthalocyanine

4-Fluorophthalonitrile (38.7 g, 0.267 mole) and 20.7 g (0.134 mole) of titanium trichloride was suspended in 200 ml 1-chloronaphthalene and heated to 210°–215° C. (oil bath) and maintained for 2½ hours at this temperature. The reaction mixture was cooled slightly, the dark solid was collected, washed with acetone and methanol. After drying, the dark blue solid (34 g) was slurried twice in refluxing dimethylformamide, filtered hot each time and washed with acetone yielding a pigment having an x-ray diffractogram peak ($2\theta$) of 7.4°.

The next example illustrates the acid pasting procedure which purifies, reduces the particle size and modifies the crystalline form of the phthalocyanine pigments.

EXAMPLE 2

Acid Pasting of Titanyl Fluorophthalocyanine

The blue solid of Example 1 was dissolved in 300 ml of concentrated sulfuric acid with cooling, stirred for one hour at room temperature, and filtered through a medium frit Buchner funnel. The acid filtrate was added to 2 liters of ice and water mixture with stirring. The bright blue solid that separated was collected, washed free of acid with water, then reslurried in 500 ml of boiling water. The phthalocyanine was collected by hot filtration and air-dried to give 26.4 g of pigment having an x-ray diffractogram peak ($2\theta$) of 6.8°.

Calcd. for $C_{32}H_{12}F_4N_8OTi$ (648.4): C, 59.2; H, 1.88; F, 11.7; N, 17.3; Ti, 7.38. Found: C, 59.0; H, 1.7; F, 11.3; N, 17.3; Ti, 6.9.

The photoconductive elements of the invention preferably are made from the 6.8° form of the pigment, as made in Example 2, or from a mixture of the 6.8° and 7.4° forms. Such a mixture can be obtained if the 6.8° form is dispersed in an organic solvent.

To prepare a photoconductive element of the invention from a titanyl fluorophthalocyanine pigment, the pigment is dispersed in a solution of a binder resin such as a polycarbonate resin. To achieve homogeneity the dispersion is milled for an extended time, e.g., for several days, in a ball mill or other homogenizing apparatus. After diluting the milled dispersion to a suitable viscosity for coating and after blending in a coating aid such as a silicone surfactant, the dispersion is coated on a conductive substrate. The latter, for example, can be a nickel-coated polyethylene terephthalate film. The coating is dried, e.g., by heating mildly for a few minutes.

The resulting charge generation layer is overcoated with a dispersion of a charge transport compound or compounds in a binder resin. This coating is then dried to provide a relatively thicker charge transport layer.

The next example describes preparation of multilayer photoconductive elements containing phthalocyanine pigments of Examples 1 and 2.

EXAMPLE 3

Multilayer Photoconductive Element Containing Titanyl Fluorophthalocyanine Pigment Pigments prepared as described in Examples 1 and 2, which are referred to as [(4-F)₄Pc]TiO, were incorporated in the following formulation:

| | |
|---|---|
| 1.75 g | High molecular weight polycarbonate binder resin poly(oxycarbonyloxy-1,4-phenylene (1-methylethylidene)-1,4-phenylene) in solution in a solvent mixture of 1,1,2-trichloromethane (40 g) and dichloromethane (26 g) |
| 0.18 g | [(4-F)₄Pc]TiO |
| 9.56 g | Dichloromethane solvent |
| 2 drops | 1% Solution of silicone surfactant in dichloromethane (DC510 surfactant of Dow Chemical |

To form a coating dispersion this formulation was placed in a glass container with 30 g of zirconia beads, shaken for three hours in a paint shaker and separated from the beads. The dispersion was then coated as a charge generation layer on a subbed, nickelized conductive poly(ethylene terephthalate) film support. The coated film was cured for 30 minutes in an 80° C. oven, yielding a dried charge generation layer of 1.5 μm thickness. This thin layer was then overcoated with a thicker layer of an organic charge transport layer containing 35 percent 1,1-bis(4-di-p-tolylaminophenyl) cyclohexane and 65 percent of a polyester binder in a solvent mixture consisting of 60 parts by weight dichloromethane and 40 parts 1,1,2-trichloroethane, the polyester being poly(4,4'-[2-norbornylidene]bisphenylene terephthalate-co-azelate) 60/40. The resulting multilayer element was cured for two hours in a 60° C. oven.

Tests were made of multilayer elements prepared as in Example 3 using the crude pigment of Example 1 and the acid pasted-pigment of Example 2.

Results are given in the following table.

| Pigment | Electrical Characteristics | | Maximum Optical Density | Pigment Particle Size (μm) |
|---|---|---|---|---|
| | Vo | Dark decay | | |
| Example 1 | −220 v. | — | — | — |
| Example 2 | −500 v. | 9.4 v/sec. | 2.5 | <1.0 |

The data show that the acid-pasting treatment of Example 2 yields a pigment of very small particle size and improves the electrical properties of the element.

When corona treated to a negative charge, the element containing the non-acid-pasted pigment (Example 1) was measured to be only about −220 volts ($V_o$). The element containing the acid-pasted pigment (Example 2) discharged from −500 to −100 volts when exposed to radiation of 830 nm at 7.0 ergs/cm$^2$. Dark decay was only 9.4 volts/sec.

EXAMPLE 4

Titanyl Hexadecylfluorophthalocyanine (F16Pc)TiO

The reaction of tetrafluoro phthalonitrile with TiCl$_3$ by the procedure of Example 1 yields the pigment, titanyl hexafluorophthalocyanine. The absorption spectrum of this compound shows a λ-max at 728 nm, which is hypsochromatically shifted about 100 nm from the λ-max of 826 nm exhibited by the titanyl tetrafluorophthalocyanine compound of Example 1. Although the electrical and dark decay characteristics of the tetrafluoro pigment were superior to those of the hexadecylfluoro species, the acid-pasted hexcadecylfluoro pigment is nevertheless useful as a near infra-red sensitive photoconductor and its dispersability in binder resins is good.

The examples have illustrated the preparation of a multilayer photoconductive element of the invention in which the charge transport layer is coated over the charge generation layer which contains a titanyl fluorophthalocyanine pigment and is contiguous to the conductive substrate. Also within the scope of the invention are "inverted" multiactive photoconductive elements in which a charge transport layer or layers are contiguous to the conductive support and a charge generation layer is coated over the charge transport layer or layers. This configuration is preferred, for example, when it is desired to charge the photoconductive element positively instead of negatively. It is also advantageous in reducing the formation of white spots in the image which are caused by electrical breakdown in the development stage. Further, it is useful in improving the uniformity of charge across the surface of the photoconductive element or, in other words, improving the electrical granularity of the element.

The next example, describes such an inverted element in which a charge generating layer containing a titanyl tetrafluorophthalocyanine compound is coated over the charge transport layer.

EXAMPLE 5

Inverted Multilayer Photoconductive Element

The pigment, titanyl tetrafluorophthalocyanine, (3.0 g) of Example 2 and 9.0 g of poly(oxycarbonyloxy-1,4-phenylenebicyclo [2.2.1]hept-2-ylidene-1,4-phenylene) binder resin were dispersed in 81 g of 1,1,2-trichloroethane solvent. The dispersion was milled for three days in a grinding mill. The milled dispersion was then diluted with 360 g of dichloromethane and filtered to provide pigment concentrate. This concentrate was incorporated in a dispersion for the charge generating layer having the following composition:

| | |
|---|---|
| 4.0 g | Polycarbonate binder resin |
| 2.0 g | Tri-p-tolylamine photoconductor |
| 32.0 g | Dichloromethane coating solvent |
| 11.0 g | 1,1,2-Trichloroethane coating solvent |
| 151.0 g | Phthalocyanine pigment concentrate |
| 0.03 g | Silicone surfactant coating aid (Dow DC510) |

For the charge transport layer a liquid dispersion of the following formulation was prepared:

| | |
|---|---|
| 172.5 g | Polycarbonate binder resin (Lexan 145 polycarbonate of General Electric which is identified as poly(oxycarbonyl-oxy-1,4-phenylene (-1-methyl-ethylidene)-1,4-phenylene) |
| 7.5 g | Poly(ethylene-co-neopentylene terephthalate) polyester binder resin |
| 120.5 g | Tri-p-tolylamine photoconductor |
| 1680.0 g | Dichloromethane |
| 420.0 g | 1,1,2-trichloroethane |
| 0.3 g | Silicone surfactant coating aid (Dow DC510) |

The inverse multilayer element was prepared by coating the indicated charge transport layer liquid dispersion on a nickel-coated subbed poly-(ethylene terephthalate) film support at 1.5 g/ft$^2$ (16.15 g/m$^2$) dry coverage and drying the coating. The charge generating layer was then formed by coating the indicated charge generating layer liquid dispersion over the charge transport layer at 0.2 g/ft$^2$ (2.15 g/m$^2$) dry coverage and drying the coating.

The inverse layer element of this example when tested in comparison with an element having the same pigment but the standard layer configuration had less electrical breakdown (as shown by reduction in image white spots after liquid development) and lower electrical granularity.

Although the examples have described pigments made from 4-fluoro and tetrafluoro phthalonitriles, any of the fluorine-substituted phthalonitriles are suitable precursors. Hence compounds of the invention include all of those represented by formula I wherein n is an integer of 1, 2, 3 or 4. For those in which n is less than 4, the fluorine can be substituted at any position on the phthalonitrile ring. All of the resulting titanyl fluorophthalonitrile pigments of the invention have near infrared sensitivity and dispersability so that photoconductive elements can be made from them by dispersion coating.

The patent to Scozzafava et al, U.S. Pat. No. 4,514,481 discloses electrophotographic layers that contain an electron donor and an electron transporting compound such as certain 4H-thiopyran-1,1-dioxides. It has been found, in accordance with the present invention, that these electron transporting compounds are unexpectedly beneficial when used in a multilayer photoconductive element of the present invention which can be positively charged for imaging. These elements have high sensitivity in the near infrared region and low dark decay, making them especially useful in laser or LED-based printers.

One disadvantage of the inverted layer configuration of multilayer photoconductor is that the thin charge generation layer is on top of the element and may be subject to abrasion as the element is used repeatedly in a series of imaging cycles. This, of course, shortens the life of the photoconductive element. By using an electron transporting compound, as described herein, the charge transport layer can be the top layer which is coated over the charge generation layer. This protects the thinner and more critically important charge generation layer from abrasion as the element is reused, and yet the element can be positively charged.

The following examples illustrate electrophotographic elements containing an electron transporting compound.

EXAMPLE 6

Photoconductive Element Containing a 4H-Thiopyran-4-one-1,1-dioxide

A photoconductive element was prepared substantially as in Example 3 except that the charge transport layer contained 30 percent by weight of the compound 4-dicyanomethylene-2,6-diphenyl-4H-thiopyran-4-one-1,1-dioxide in the polyester binder. The charge generation layer contained titanyl tetrafluorophthalocyanine in a polycarbonate binder as in Example 3. The conductive layer was an aluminum plate.

EXAMPLE 7

Another multilayer element was prepared as in Example 6 except that the electron transporting compound was 4-dicyanomethylene-2,6-di-m-tolyl-4H-thiopyran-1,1-dioxide and the conductive layer was a nickel-coated polymeric film.

COMPARATIVE EXAMPLE

Aggregate Charge Generation Layer

A multilayer element like that of Example 6 was prepared except that, instead of titanyl fluorophthalocyanine, an aggregate photoconductor as in Berwick et al U.S. Pat. No. 4,175,960 was used in the charge generation layer.

The photoconductive elements of Example 6 and 7 and the comparative example were charged to 500 volts positive and exposed to radiation sufficient to discharge the element to 250 volts. The exposure for Examples 6 and 7 was at 830 nm and for the comparative example was at 680 nm, that being within the region of sensitivity of the aggregate photoconductor. The relative quantities of exposure required to discharge each element to 250 volts are listed in the table below, an arbitrary value of 100 being assigned to the quantity of exposure for the comparative example. The table also shows the residual voltage ($V_{toe}$) of each element after full irradiation.

TABLE

| Example No. | Dark Decay (V/sec) | Relative Exposure (−500 V−−250 V) | Residual Voltage $V_{TOE}$ |
|---|---|---|---|
| 6 | 4 | 12.1 | 40 |
| 7 | 4 | 14.0 | 44 |
| Comp. Example | 5 | 100* | 124 |

*arbitrarily assigned a value of 100 for comparison

The results show that when the thiopyrandioxide electron transporting compounds were used with a titanyl fluorophthalocyanine charge generator in accordance with the invention (Examples 6 and 7), the exposure required to discharge the photoconductor from $V_o=500$ volts to 250 volts was about one-eighth the exposure required for the same degree of discharge of the aggregate-type photoconductor used with the same class of electron transporting compound. The table also shows that upon complete radiation the elements of the invention discharged to voltages of 40 and 44 while the residual voltage for the element having a different charge generation layer was discharged only to 124 volts. These results demonstrate an unexpected cooperation of the titanyl fluorophthalocyanine layer and the electron transporting layer in the multilayer photoconductive elements of the invention.

When using an electron transport compound in a multilayer element of the invention having a conductive layers which is electron injecting, e.g., nickel, it may be desirable to place a thin barrier layer between the conductive layer and the charge generation layer to prevent dark discharge. The barrier layer can be a non-conductive polymer such as a polyester or other materials disclosed in U.S. Pat. No. 4,175,960.

One of the advantages of the novel phthalocyanine pigments of the invention is that because of their sensitivity to radiation in the near infrared region of the spectrum they can be used in photoconductive elements which record the radiation of diode lasers. They are not limited to that use, however. They can be used in admixture with charge generation compounds having sensitivity, e.g., to visible light to provide photoconductive elements that have a broad range of sensitivity including the visible light range and near infrared.

The charge generation layer which contains the novel phthalocyanine pigments can have a thickness within a wide range depending upon the degree of photosensitivity desired. Thickness affects photosensitivity in two opposite ways. As thickness increases a greater proportion of actinic radiation is absorbed by the layer, but there is a greater likelihood of a charge carrier being trapped and thus not contributing to image formation. These two factors must be balanced in selecting an appropriate thickness. A thickness in the range of about 0.05 μm to 6.0 μm is preferred for maximum photosensitivity. At thicknesses much below 0.05 μm the radiation absorption is inadequate and at thicknesses much above 6.0 μm, the trapping of charge carriers becomes excessive.

As indicated in the examples and as disclosed in U.S. Pat. No. 4,175,960, the charge transport layer in a multilayer element is thicker than the charge generation layer. Its thickness can be of the order of 3 to 40 μm, preferably, 5 to 30. It can be several times thicker than the charge generation layer, e.g., 2 to 20 times thicker.

Although the examples have illustrated specific charge transport layer materials, the charge transport layer can be monomeric or polymeric organic photoconductors or inorganic materials which can transport charge carriers generated in the charge generation layer. Combinations may be used. Most charge transport materials preferentially accept and transport either positive charges (holes) or negative charges (electrons), although materials are known which will transport both positive and negative charges. Transport materials with a preference for conduction of positive charge carriers are called p-type transport materials and those with a preference for conduction of negative charges are called n-type.

Various p-type organic charge transport materials can be used in the charge transport layer in accordance with the present invention. Representative p-type organic photoconductive materials include:

1. Carbazoles including carbazole, N-ethyl carbazole, N-isopropyl carbazole, N-phenyl carbazole, halogenated carbazoles, various polymeric carbazole materials such as poly(vinyl carbazole) halogenated poly(vinyl carbazole), and the like.

2. Arylamines including monoarylamines, diarylamines, triarylamines, as well as polymeric arylamines. Examples of arylamine photoconductors include the non-polymeric triphenylamines illustrated in Klupfel et U.S. Pat. No. 3,180,730 issued Apr. 27, 1965; the polymeric triarylamines described in Fox U.S. Pat. No. 3,240,597 issued Mar. 15, 1966; the triarylamines having at least one of the aryl radicals substituted by either a vinyl radical or a vinylene radical having at least one active hydrogen-containing group, as described in Brantly et al U.S. Pat. No. 3,567,450 issued Mar. 2, 1971; the triarylamines in which at least one of the aryl radicals in substituted by an active hydrogen-containing group, as described in Brantly et al U.S. Pat. No. 3,658,520 issued Apr. 25, 1972; and tritolylamine.

3. Polyarylalkanes of the type described in Noe et al U.S. Pat. No. 3,274,000 issued Sept. 20, 1966; Wilson U.S. Pat. No. 3,542,547 issued Nov. 24, 1970 and in Rule et al U.S. Pat. No. 3,615,402 issued Oct. 26, 1971. Preferred polyarylalkane photoconductors can be represented by the formula:

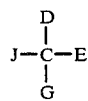

wherein D and G, which may be the same or different, represent aryl groups and J and E, which may be the same or different, represent a hydrogen atom, an alkyl group, or an aryl group, at least one of D, E and G containing an amino substituent. An especially useful polyarylalkane photoconductor which may be employed as the charge transport material is a polyarylalkane having the formula noted above wherein J and E represent a hydrogen atom, an aryl group, or an alkyl group and D and G represent substituted aryl groups having as a substituent thereof a group represented by the formula:

wherein: R represents an unsubstituted aryl group such as phenyl or an alkyl substituted aryl such as a tolyl group. Additional information concerning certain of these latter polyarylalkanes may be found in Rule et al U.S. Pat. No. 4,127,412 issued Nov. 28, 1978.

4. Strong Lewis bases such as aromatic compounds, including aromatically unsaturated heterocyclic materials which are free of strong electron withdrawing groups.

Such aromatic Lewis bases include tetraphenylpyrene, 1-methylpyrene, perylene, chrysene, anthracene, tetraphene, 2-phenyl naphthalene, azapyrene, fluorene, fluorenone, 1-ethylpyrene, acetyl pyrene, 2,3-benzochrysenes, 3,4-benzopyrene, 1,4-bromopyrene, phenylindole, polyvinyl carbazole, polyvinyl pyrene, polyvinyl tetracene, polyvinyl perylene, and polyvinyl tetraphene.

5. Other useful p-type charge-transport materials include the p-type organic photoconductors, including metallo-organo materials, known to be useful in electrophotographic processes, such as any of the organic photoconductors described in Research Disclosure, Vol. 109, May 1973, pages 61–67, paragraph IV (A) (2) through (13) which are p-type photoconductors. (Research Disclosure is published by Industrial Opportunities Limited, Havant, Hampshire, P09 1EF, United Kingdom.)

Representative of n-type charge-transport materials are strong Lewis acids such as organic and metallo-organic compounds containing one or more aromatic, including aromatically unsaturated heterocyclic compounds having an electron withdrawing substituent. These are considered useful because of their electron accepting capability. Typical electron withdrawing substituents include cyano and nitro groups; sulfonate groups; halogens such as fluorine chlorine, bromine, and iodine; ketone groups; ester groups; acid anhydride groups; and other acid groups such as carboxyl and quinone groups. Examples of such n-type aromatic Lewis acids having electron withdrawing substituents include phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4'-dinitrobiphenyl, 2,4,6-tri-nitroanisole, trichlorotrinitrobenzene, trinitro-o-toluene, 4,6-dichloro-1,3-dinitrobenzene, 4,6-dibromo-1,3-dinitrobenzene, p-dinitrobenzene, chloranil, bromanil, 2,4,7-trinitro-9-fluorenone, 2,4,5,7-tetranitrofluorenone, trinitroanthracene, dinitroacridene, tetracyanopyrene, dinitroanthraquinone, and mixtures thereof.

Other useful n-type charge transport materials are conventional n-type organic photoconductors, for example, complexes of 2,4,7-trinitro-9-fluorenone and poly(vinyl carbazole). Still other useful n-type organic and metallo-organo photoconductive materials include any of the n-type organic photoconductive materials known to be useful in electrophotographic processes such as any of those described in *Research Disclosure*, Vol. 109, May 1973, pages 61–67, paragraph IV(A) (2) through (13).

A single charge transport layer or more than one can be employed. Where a single charge transport layer is employed it can be either a p-type or an n-type material.

Where it is intended that the charge generation layer be exposed to actinic radiation through the charge transport layer, it is preferred that the charge transport layer have little or no absorption in the region of the electromagnetic spectrum to which the charge generation layer responds, thus permitting the maximum amount of actinic radiation to reach the charge generation layer. Where the charge transport layer is not in the path of exposure, this consideration does not apply.

When solvent coating the layers, a film-forming polymeric binder can be employed. The binder may, if it is electrically insulating, help to provide the element with electrical insulating characteristics. It also is useful (a) in coating the layer, (b) in adhering the layer to an adjacent layer, and (c) when it is a top layer, in providing a smooth, easy to clean, wear resistant surface.

When a polymeric binder is employed in either the charge generation or charge transport layer, the optimum ratio of charge generation or charge transport material to binder may vary widely depending on the particular binder and charge transport materials. In general, useful results are obtained wherein when the amount of active charge generation or charge transport material contained within the layer varies within the range of from about 2 to about 90 weight percent based on the dry weight of the layer.

Representative materials which may be employed as binders in the charge generation and charge transport layers are film-forming polymers having a fairly high dielectric strength and good electrically insulating properties. Such binders include, for example, styrene-butadiene copolymers; polyvinyl toluene-styrene copolymers; styrene-alkyd resins; silicone-alkyd resins; soya-alkyd resins; vinylidene chloride-vinyl chloride copolymers; poly(vinylidene chloride); vinylidene chlorideacrylonitrile copolymers; vinyl acetatevinyl chloride copolymers; poly(vinyl acetals), such as poly(vinyl butyral); nitrated polystyrene; polymethylstyrene; isobutylene polymers; polyesters, such as poly[ethylene-co-alkylenebis(alkyleneoxyaryl)phenylenedicarboxylate]; phenolformaldehyde resins; ketone resins; polyamides; polycarbonates; polythiocarbonates; poly[ethylene-co-isopropylidene-2,2-bis(ethyleneoxyphenylene) terephthalate]; copolymers of vinyl haloacrylates and vinyl acetate such as poly(vinyl-m-bromobenzoate-co-vinyl acetate); and chlorinated poly(olefins), such as chlorinated poly(ethylene).

Binder polymers should provide little or no interference with the transport of charge carriers through the layer. Examples of binder polymers which are especially useful in p-type charge transport layers include styrene-containing polymers, bisphenol A polycarbonates, phenol-formaldehyde resins, polyesters such as poly[ethylene-co-isopropylidene-2,2-bis(ethyleneoxyphenylene)]terephthalate, and copolymers of vinyl haloacrylates and vinylacetate such as poly(vinyl-m-bromobenzoate-co-vinyl acetate).

The charge generation and charge transport layers can also contain other addenda such as leveling agents, surfactants and plasticizers to enhance or improve various physical properties of the layer. In addition, various addenda to modify the electrophotographic response of the element can be incorporated in the charge transport layer. For example, contrast control materials, such as certain hole-trapping agents and certain easily oxidized dyes can be incorporated. Such contrast control materials are described in *Research Disclosure*, Vol. 122, June 1974, p. 33, in an article entitled "Additives For Contrast Control In Organic Photoconductor Compositions and Elements".

When the charge generation layer or the charge transport layer is solvent coated, the components are dissolved or dispersed in a liquid together with the binder, if one is employed, and other addenda. Useful liquids include aromatic hydrocarbons such as benzene, naphthalene, toluene, xylene and mesitylene; ketones such as acetone and butanone; halogenated hydrocarbons such as methylene chloride, chloroform and ethylene chloride; ethers including cyclic ethers such as tetrahydrofuran and ethyl ether; and mixtures thereof.

A variety of electrically conducting supports can be employed in the elements of this invention, such as for example, paper (at a relative humidity above 20 percent); aluminum-paper laminates; metal foils such as aluminum foil, zinc foil, etc.; metal plates such as aluminum, copper, zinc brass and galvanized plates; vapor deposited metal layers such as silver, chromium, nickel, aluminum and the like coated on paper or conventional photographic film bases such as poly(ethylene terephthalate), cellulose acetate, polystyrene, etc. Such conducting materials as chromium, nickel, etc. can be vacuum deposited on transparent film supports in sufficiently thin layers to allow electrophotographic elements prepared therewith to be exposed from either side. An especially useful conducting support can be prepared by coating a support material such as poly(ethylene terephthalate) with a conducting layer containing a semiconductor dispersed in a resin. Such conducting layers both with and without electrical barrier layers are described in U.S. Pat. No. 3,245,833 by Trevoy, issued Apr. 12, 1966. Other useful conducting layers include compositions consisting essentially of an intimate mixture of at least one protective inorganic oxide and from 30 to 70 percent by weight of at least one conducting metal, e.g., a vacuum-deposited cermet conducting layer as described in Rasch U.S. Pat. No. 3,880,657 issued Apr. 29, 1973. Likewise, a suitable conducting coating can be prepared from the sodium salt of a carboxyester lactone of maleic anhydride and a vinyl acetate polymer. Such conducting layers and methods for their optimum preparation and use are disclosed in U.S. Pat. Nos. 3,007,901 by Minsk issued Nov. 7, 1961 and 3,262,807 by Sterman et al issued July 26, 1966.

The various layers of the element can be coated directly on the conducting substrate. In some cases, it may be desirable to use one or more intermediate subbing layers over the conducting substrate to improve adhesion between the conducting substrate and overlying layers or to act as an electrical barrier layer as described in Dessauer U.S. Pat. No. 2,940,348. Such subbing layers, if used, typically have a dry thickness in the range of about 0.01 to about 5 $\mu$m. Typical subbing layer materials include film-forming polymers such as cellulose nitrate, polyesters, copolymers of poly(vinyl pyrrolidone) and vinylacetate, and various vinylidene chloride-containing polymers including two, three and four component polymers prepared from a polymerizable blend of monomers or prepolymers containing at least 60 percent by weight of vinylidene chloride. Representative vinylidene chloride-containing polymers include vinylidene chloride-methyl methacrylate-itaconic acid terpolymers as disclosed in U.S. Pat. No. 3,143,421. Various vinylidene chloride containing hydrosol tetrapolymers which may be used include tetrapolymers of vinylidene chloride, methyl acrylate, acrylonitrile and acrylic acid as disclosed in U.S. Pat. No. 3,640,780. Other useful vinylidene chloride-containing copolymers include poly(vinylidene chloride-methyl acrylate), poly(vinylidene chloride-methacrylonitrile), poly-(vinylidene chloride-acrylonitrile), and poly-(vinylidene chloride-acrylonitrile-methyl acrylate). Other subbing materials include the so-called tergels described in Nadeau et al U.S. Pat. No. 3,501,301 and the vinylidine chloride terpolymers described in Nadeau U.S. Pat. No. 3,228,770.

One especially useful subbing layer is a hydrophobic film-forming polymer or copolymer free from any acid-containing group, such as a carboxyl group, prepared from a blend of monomers or prepolymers, each of said monomers or prepolymers containing one or more polymerizable ethylenically unsaturated groups. Useful materials include many of the above-mentioned-copolymers, and in addition, the following: copolymers of polyvinylpyrrolidone and vinyl acetate, poly(vinylidene chloride-methyl methacrylate), and the like.

Optional overcoat layers can also be used if desired. For example, to improve surface hardness and resistance to abrasion, the surface layer of the element of the invention can be coated with one or more electrically insulating, organic polymer coatings or electrically insulating, inorganic coatings. A number of such coatings are well known in the art. Typical overcoats are described for example, in Research Disclosure, "Electrophotographic Elements, Materials and Processes", Vol. 109, p. 63, Paragraph V, May 1973.

While the novel photoconductive elements are useful in electrophotography, they can also be used in other arts, such as in solar cells, where photoconductive elements are employed.

This invention has been described in detail with certain preferred embodiments thereof, but it will be understood that variations and modifications can be effected within the spirit and scope of the invention.

We claim:

1. A photoconductive titanylphthalocyanine pigment having fluorine ring substitution.
2. A pigment according to claim 1 having at least one fluorine substituent on each carbocyclic ring thereof.
3. A pigment according to claim 1 having one fluorine substituent on each carbocyclic ring thereof.
4. A pigment according to claim 2 wherein the compound is titanyl 2,9,16,23-tetrafluorophthalocyanine.
5. A pigment according to claim 1 wherein the compound is titanyl hexadecylfluorophthalocyanine.
6. A pigment according to claim 3 having an x-ray diffractogram peak ($2\theta$) of 6.8°.
7. A pigment according to claim 4 having an x-ray diffractogram peak ($2\theta$) of 7.4°.
8. A pigment according to claim 3 which is a mixture of the 6.8° and 7.4° forms.
9. A photoconductive element comprising an electrically conductive substrate and a photoconductive layer, said photoconductive layer comprising a binder resin and a pigment of claim 1.
10. A photoconductive element according to claim 9 which is a multilayer element comprising additionally at least one charge transport layer.
11. A photoconductive element according to claim 10 wherein the charge generation layer is contiguous to the conductive substrate and a charge transport layer is the surface layer and contains a 4H-thiopyran-1,1-dioxide compound as an electron transport compound.
12. An element according to claim 11 wherein said electron transport compound is 4-dicyanomethylene-2,6-di-phenyl-4H-thiopyran-1,1-dioxide.
13. An element according to claim 11 wherein said electron transport compound is 4-dicyanomethylene-2,6-di-m-tolyl-4H-thiopyran-1,1-dioxide.
14. A photoconductive element according to claim 10 wherein a charge transport layer is contiguous to the conductive substrate and the charge generation layer is the surface layer.
15. A photoconductive element according to claim 9 wherein the layers containing said phthalocyanine pigment are formed by dispersion coating.
16. A photoconductive element according to claim 10 wherein the layers containing said phthalocyanine pigment are formed by dispersion coating.
17. A photoconductive element according to claim 9 wherein the phthalocyanine pigment before incorporation in the element has been subjected to acid treatment, the acid treatment comprising dissolving the pigment in cold concentrated mineral acid, adding the acid solution to cold water to reprecipitate the phthalocyanine compound, washing the precipitate free of acid and drying the washed precipitate.
18. A photoconductive element according to claim 14 wherein the charge generation layer is formed by coating on a support a dispersion obtained by milling the binder resin with the acid-treated phthalocyanine pigment.
19. A photoconductive element comprising an electrically conductive substrate and a photoconductive layer which contains a pigment according to claim 6.
20. A photoconductive element comprising an electrically conductive substrate and a photoconductive layer which contains a pigment according to claim 8.
21. A method of forming an electrophotographic image which comprises electrostatically charging a photoconductive element according to claim 9, exposing the charged element to a pattern of near infrared radiation and developing the resulting charge pattern on the photoconductive element.

* * * * *